April 6, 1937. R. C. BERGVALL Re. 20,319

SIMULTANEOUSLY TRIPPING RELAYING SYSTEM

Original Filed June 19, 1930 2 Sheets-Sheet 1

Inventor
Royal C. Bergvall.
By O. B. Buchanan
Attorney

April 6, 1937. R. C. BERGVALL Re. 20,319

SIMULTANEOUSLY TRIPPING RELAYING SYSTEM

Original Filed June 19, 1930 2 Sheets-Sheet 2

Inventor
Royal C. Bergvall.
By O. B. Buchanan
Attorney

Reissued Apr. 6, 1937

Re. 20,319

UNITED STATES PATENT OFFICE 20,319

SIMULTANEOUSLY TRIPPING RELAYING SYSTEM

Royal C. Bergvall, Lower Merion Township, Montgomery County, Pa., assignor to Westinghouse Electric & Manufacturing Company, a corporation of Pennsylvania Original No. 1,967,110, dated July 17, 1934, Serial No. 462,534, June 19, 1930. Application for reissue July 6, 1936, Serial No. 89,138

27 Claims. (Cl. 175—294)

My invention relates to relaying systems, and it has more particular relation to high-frequency relaying systems and also to a system for simultaneously tripping the circuit breakers at the two ends of a faulty section of a transmission line.

In order to obtain selectivity, in relaying systems prior to my invention, it has been necessary to have the circuit breakers at each end of a faulty line section open in succession instead of simultaneously. In such prior relaying systems, it was necessary for the fault-responsive element to operate very much more slowly for the more remote faults than for the nearby faults, and this time-delay action had to be so great that, for faults at or beyond the far end of the line section, the time delay was greater than the relaying time for nearby faults plus the very much longer time required for the circuit breaker action.

Studies of the stability of transmission lines have shown the very great importance of clearing a faulty line section as quickly as possible, particularly when the clearing time is made as small as 12 cycles, more or less if possible, on a 60 cycle system.

It is the object of my present invention to provide means for simultaneously tripping the circuit breakers at both ends of a faulty line section.

A further object of my invention relates to a high-frequency relaying system and to a novel coupling means for coupling the high-frequency apparatus to the transmission line.

A still further object of my invention relates to means for preventing the loss of several cycles of relaying time which has been encountered heretofore by reason of the fluttering or chattering of the fault-responsive relay element for certain types of faults. Because of the high reactance of the tripping coil, which retards the instantaneous building up of the tripping current, it has been possible for the fault-responsive element to flutter rapidly, so that its contacts do not remain closed for a sufficient time to enable the tripping current to build up to a value of the order of an ampere, or other value sufficient to maintain a very tiny arc across the fluttering contacts, as has been shown by oscillographic tests. This disadvantage is overcome by shunting the highly inductive tripping coil with a non-inductive impedance which will permit the flow of an instantaneous current large enough to arc over the fluttering contacts.

Figure 1:
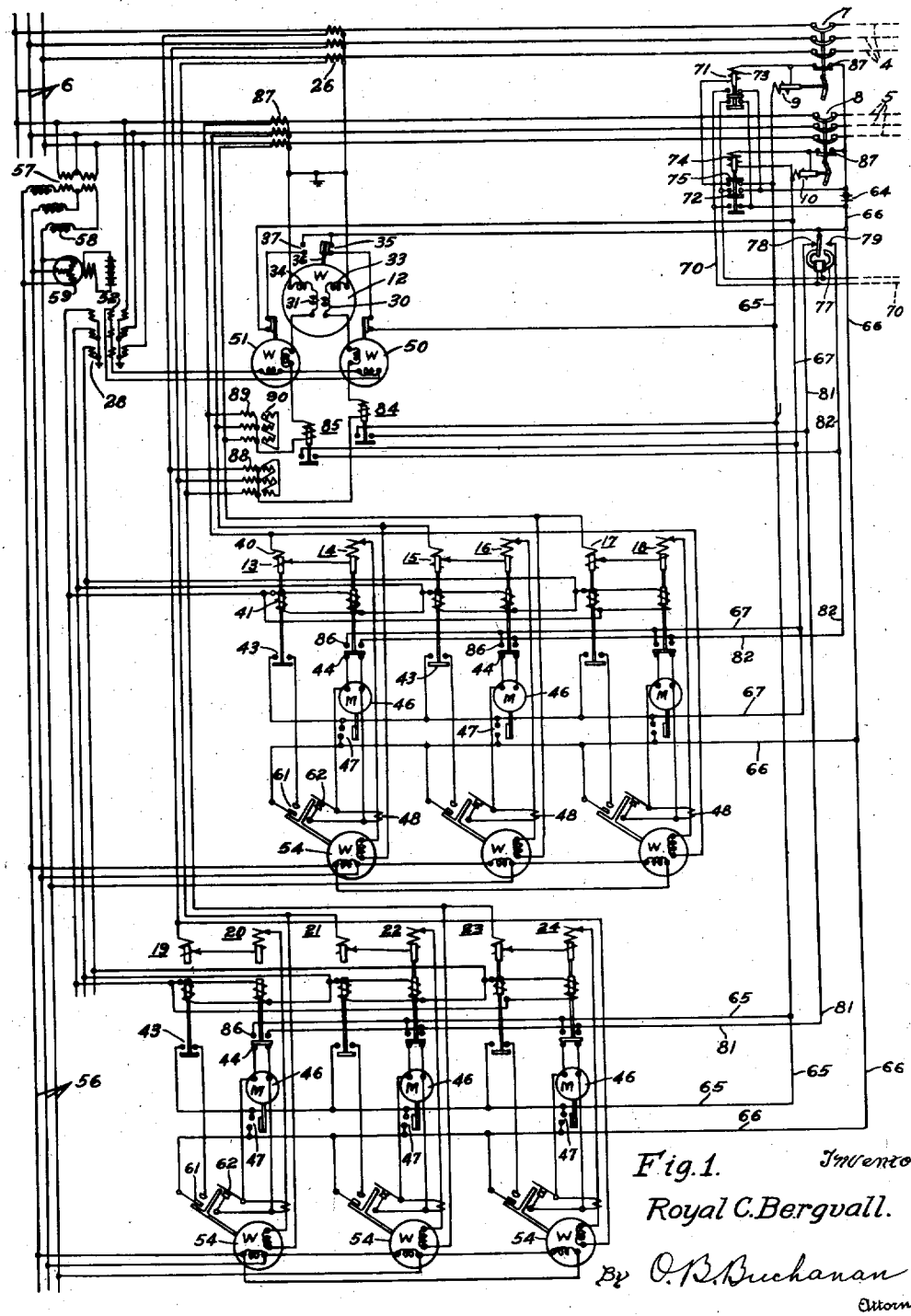
Figure 2:
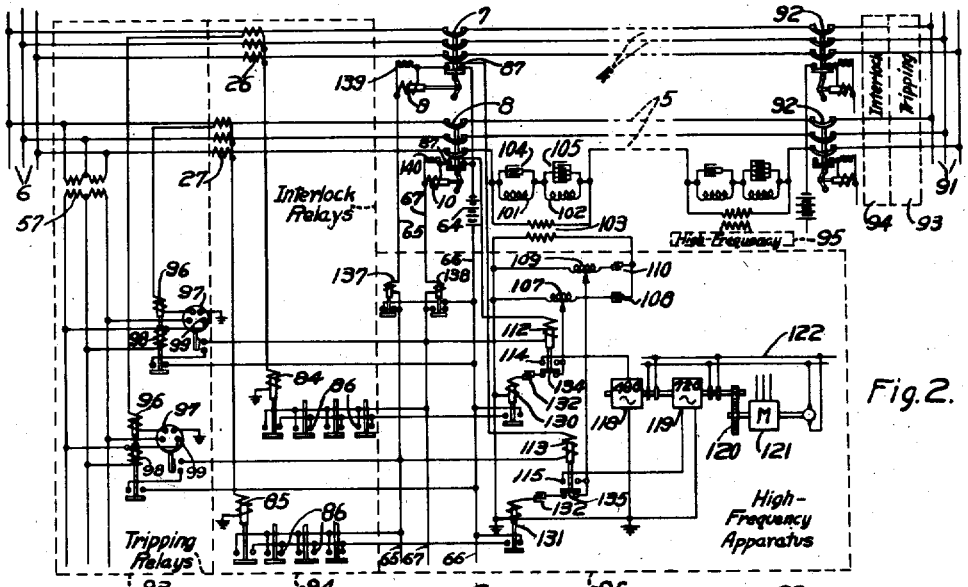
Figure 3:
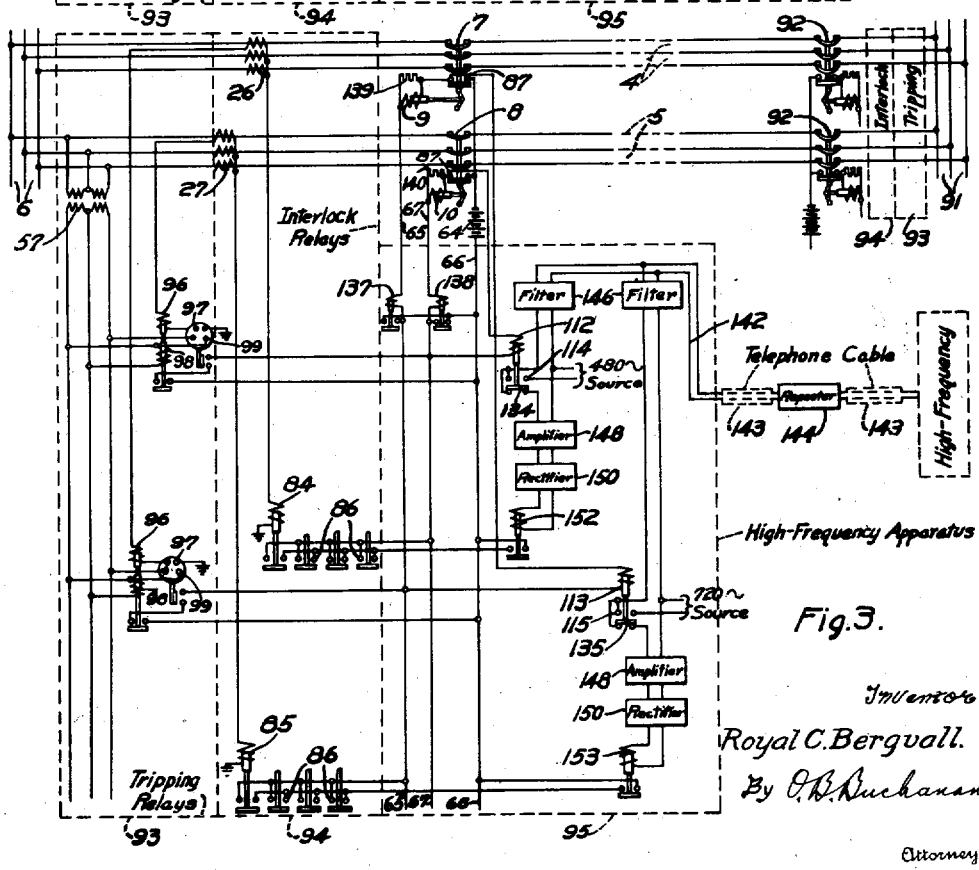

With the foregoing and other objects in view, my invention consists in the methods, systems, combinations and apparatus hereinafter described and claimed and illustrated in the accompanying drawings, wherein Figure 1 is a diagrammatic view of circuits and apparatus embodying some features of my invention in a polarized-current pilot-wire system, Fig. 2 is a similar view illustrating my invention as applied to a high-frequency relaying system utilizing the transmission line as the means for carrying the high-frequency relaying currents, and Fig. 3 is a similar view illustrating the application of my invention to a high-frequency pilot-wire relaying system.

In Figure 1 my invention is shown applied to a two-circuit three-phase transmission line, only one end of which is shown, the other end being omitted as being a duplicate of the first end. Two three-phase transmission lines 4 and 5 are connected to a bus 6 through circuit breakers 7 and 8, respectively, said circuit breakers having tripping coils 9 and 10.

In the system shown in Figure 1, two different types of fault-distance-responsive tripping relay-elements, namely, a high-speed or instantaneous differential ground relay 12 for detecting single phase to ground faults and twelve impedance relays 13 to 24 for detecting all other faults on either one of the two lines 4 and 5, are used.

Energy is provided for supplying the several relays, by means of two Y-connected current transformers 26 and 27, connected in the respective lines, and a potential transformer 28. The differential ground relay 12 is essentially a quick-acting wattmeter device having a stationary element provided with two coils 30 and 31 which are connected in the neutral or residual-current circuits of the respective current transformers 26 and 27, for jointly providing a field which operates dynamo-electrically on a movable element which is energized from two other current coils 33 and 34 which are connected in the respective residual-current circuits aforesaid. The two field coils 30 and 31 are connected in opposition and the two current coils 33 and 34 are connected cumulatively, or the other way around, so that when there is any residual or zero-phase-sequence ground current in either one of the transmission lines, the differential ground relay 12 will respond to a predetermined degree of unbalance of these residual currents. The residual differential ground relay 12 is provided with a movable contact member 36 which engages one or the other of two pairs of stationary contact members 35 and 37, depending on which line is faulted.

The impedance relays 13 to 24 are shown schematically as each comprising a current-responsive actuating coil 40 and voltage-responsive restraining coil 41, so that the relays pick up at a predetermined apparent impedance, or ratio between voltage and current. I intend, by the term "impedance element", however, to include any element which responds to either the apparent or real impedance of the transmission line, or which picks up at any predeterminable ratio of any voltage quantity or component to any current quantity or component. The current coils of the relays 13—14, 15—16, and 17—18 are connected across the respective delta phases of the current transformer 27 of transmission line 5, whereas the current coils of the relays 19—20, 21—22, and 23—24 are connected across the delta phases of the other current transformer 26. The voltage coils 41 of the impedance relays 13 to 24 are connected across the corresponding delta phases of the potential transformer 28.

All of the impedance-responsive elements 13 to 24 are quick-acting or instantaneous in their operation, by which I mean that the time required for their operation is quite small compared to the time required by the circuit breaker to clear a fault after its tripping circuit has been energized, and by which I also means that the relay time is not significantly varied in accordance with the distance of the fault so as to secure selectivity by such variation in the relay time.

It will be noted that the impedance elements 13 to 24 are connected in pairs, so that each delta phase of each line has two impedance relays. The first instantaneous impedance-responsive element, which is indicated by the numerals 13, 15, 17, 19, 21 and 23 in the respective phases, never picks up for faults located as far away as the circuit breaker (not shown in Fig. 1) at the corresponding station at the other end of the line sections 4 and 5. The second instantaneous impedance-responsive element, which is indicated by the numerals 14, 16, 18, 20, 22 and 24 in the respective phases, will pick up for faults located as far away as the other circuit breaker at the other end of the corresponding line section. The first impedance elements are provided with normally open tripping contacts 43. The second instantaneous impedance elements are provided with contacts 44 for setting in operation a time-switch element represented as a small synchronous motor 46 for closing tripping contacts 47 after a predetermined time interval which gives the first impedance elements at the other end of the line a chance to first clear the fault, through their circuit breakers, if they are going to clear the fault at all. The timing switch 46 is shown as being energized from a small current transformer 48 in circuit with the current coil of the corresponding second impedance relay element, and hence the controlling contacts 44 for setting the timing switch in operation are normally closed, so as to short-circuit the timing element.

The fault-distance-responsive tripping-relay elements thus far described must be associated with means for discriminating between faults which are being fed from the adjacent bus 6, and faults beyond the adjacent bus 6 which are being fed from the line in which the particular relay is located, and this function is accomplished, in the case of the residual-current differential ground relay 12, by means of two high-speed directional residual current relays 50 and 51 which compare the direction of the respective residual currents with the direction of the residual voltage, the latter quantity being obtained from three serially connected tertiary windings 52 on the potential transformer 28, the primary and secondary windings of this potential transformer being connected in star so as not to short-circuit out the residual or zero-phase-sequence voltage.

In the case of the impedance elements 13 to 24, the direction-discriminating function is accomplished by two sets of three similar directional elements 54 connected in the respective delta phases of the two lines, so as to compare the delta current with a voltage which is derived from an auxiliary voltage bus 56 which is energized, from an auxiliary potential transformer 57, through three impedance devices 58. The auxiliary voltage bus 56 is further energized from a small synchronous condenser 59 which floats across its terminals and serves to prevent too great a variation in the phase and/or magnitude of the voltage applied to the voltage coil of the directional element 54, even though the line voltage should be suddenly reduced to zero by a dead short-circuit nearby. Correct operation of the directional elements 54 is thus assured for a sufficient time to enable the fault to be cleared. Each directional element is provided with normally open contacts 61 and normally closed contacts 62, associated respectively with the first and second induction relay contacts 43 and 44, meaning, by "normally", in the present instance, the condition of the directional element when tripping is not desired.

The tripping circuit of the circuit breaker 7 in line 4 comprises its tripping coil 9 which is energized from a battery 64 through several sets of contacts which are connected in parallel between a tripping bus 65 and a positive bus 66 connected to the battery 64. In response to single phase ground faults occurring within a predetermined distance which is less than the total distance to the next relaying station, the circuit breaker 7 is tripped by the closing of the contacts 35 of the differential ground relay, in series with the contacts of the directional residual relay 50. In response to any other faults, up to a distance less than the length of the line up to the next relaying station, the circuit breaker 7 is tripped by one of the first impedance elements 19, 21 or 23, the contacts 43 of which are in series, respectively, with the respective normally open contacts 61 of the associated directional element 54, as shown in Fig. 1. In case the first impedance element 19, 21 or 23 in any phase should fail to cause the fault to be cleared, the circuit breaker 7 may be tripped by one of the three associated timing switches 46, the contacts 47 of which are connected in parallel across the tripping buses 65 and 66.

The tripping circuit for the circuit breaker 8 in line 5 comprises its tripping coil 10, the same battery 64, the same positive battery bus 66, the relay contacts as shown and as will be understood from the foregoing explanation, and a relaying bus 67 which is connected to the tripping coil 10.

The fault-distance-responsive tripping-relay elements which operate instantaneously cannot be made to respond to faults in a certain small section of the line close to the next relaying station, because of the impossibility of certainly discriminating between faults located in the line section between its two circuit breakers and faults located in some other line section close to the far end of the line in which the relays in question are located. As to nearby faults, however, it is easy to discriminate between the faulty line and the clear line by means of the fault-distance-responsive elements in combination with the respective directional elements.

In accordance with my invention, I secure instantaneous tripping in all cases, whenever a fault is located anywhere on a line section, by sending a tripping impulse to the far end of the line whenever the tripping coil of the near circuit breaker is energized. Thus, both ends of a faulty line section are cleared substantially simultaneously in response to the operation of any instantaneous fault detecting relay element.

In Fig. 1, the means for sending tripping impulses from one relaying station to the next comprises a pilot wire 70, a cable or a pair of overhead conductors, which is energized, at each end, by means of two quick-acting relays 71 and 72, the actuating coils 73 and 74 of which are connected in parallel with the respective tripping coils 9 and 10 of the circuit breakers associated with the two parallel lines 4 and 5. Means may be provided for preventing the simultaneous operation of the two relays 71 and 72, as is suggested by the interlocking contacts 75 as shown. The two relays 71 and 72 energize the pilot wire 70, in opposite polarities, from the tripping battery 64, so that the tripping impulse may be regarded as being a positive impulse, for one of the lines, and negative for the other.

The tripping impulses carried by the pilot wire 70 are received by means of a polarized relay 77 having contacts 78 and 79 which are energized in accordance with the direction of the impulses in the pilot wire.

It is not feasible, with most pilot wires, to have a circuit breaker or line-interrupting device operate every time an impulse is received, because of the susceptibility of the pilot wire to inductive disturbances, producing impulses which have not been sent. In accordance with my invention, therefore, one or more fault-detector interlock-contact relay elements are provided, at each relaying station, for indicating the existence of a fault somewhere on the system, without necessarily discriminating as to the particular line section in which the fault is located. The polarized relay 77 is locked out of action at all times except when the existence of some sort of fault is indicated by the fault-detector interlock-contact relay element or elements.

As shown in Fig. 1, one terminal of the polarized relay 77 is connected to the positive battery bus 66, and its two contacts 78 and 79 are connected to two polarized-relay buses 81 and 82, respectively, which are joined to the two tripping buses 65 and 67, respectively, through a plurality of fault-detector interlock-contact relay elements, which, in the particular system shown in Fig. 1, comprise two over-current relays 84 and 85 connected in the residual-current circuits of the respective current transformers 26 and 27, for detecting the presence of single phase ground faults, and an auxiliary normally open contact 86 on each of the second impedance elements 14, 16, 18, 20, 22 and 24 in the respective phases, for detecting the presence of all other faults. The over-current relays 84 and 85 are set to operate slightly below the value of current corresponding to a ground fault at the far bus, so that it will respond to ground faults located slightly beyond the far bus. The second instantaneously operating impedance element in each phase is selected for cooperation with the polarized relay 77 because this second element will operate for faults in the distant end zone. The contacts of the over-current fault-detector relay 84 are connected in parallel with the contacts 86 of the second impedance relays 20, 22 and 24, between the polarized-relay bus 82 and the tripping bus 65. In like manner, the contacts of the over-current relay 85 are connected in parallel with the auxiliary contacts 86 of the other three second impedance elements 14, 16 and 18, between the polarized-relay bus 82 and the tripping bus 67. Improper operating of circuit breakers should not occur due to disturbances on the pilot wire since the interlock contacts will not be closed except when a fault exists on the system.

The pilot wires can easily be supervised with indicating lamps and bell alarm so that grounds, open wires, or short circuits can quickly be detected. The contacts on the interlock relays will prevent improper opening of circuit breakers in case the pilot wire protectors break down due to induced voltages during fault conditions.

The operation of the polarized relay 77, at each relaying station, may be summarized as follows. This relay is for the purpose of tripping either of the circuit-breakers 7 or 8 (according to the direction of the direct current through the relay 77) in response to faults which are so close to the next relaying station (not shown in Fig. 1) that the instantaneous relays 50, 19, 21 and 23 (for circuit-breaker 7) or 51, 13, 15 and 17 (for circuit-breaker 8) cannot be set so as to respond thereto. (If said instantaneous relays were set so as to respond to such remote faults near the far ends of the line-sections which they protect, they would also respond to some still more remote faults which are not in the line-section which is being protected, thus tripping out the line-section when there is no fault therein.) However, a fault, in the line-section 4 or 5, which is remote with respect to the relaying station shown in Fig. 1, is close to the next relaying station at the right-hand ends of said line-sections, so that the aforementioned instantaneous relays at said next relaying station readily respond to said faults and energize the pilot wires 70 in the proper polarity.

When the polarized relay 77 of Fig. 1 is thus energized, it connects the positive battery terminal to one of the relay busses 81 or 82, but it does not trip the circuit-breaker 7 or 8 unless the presence of a fault somewhere on the system is assured by a fault-detector interlock-contact means, such as the ground-relay 84 and the auxiliary contacts 86 of the more remotely responsive instantaneous impedance relays 20, 22 and 24 (for the circuit-breaker 7), or the ground-relay 85 and the auxiliary contacts 86 of the more remotely responsive instantaneous impedance relays 14, 16 and 18 (for the circuit-breaker 8). In this way, a chance shock-excitation or inductive-interference excitation of the pilot wires 70, when there is no fault on the system, will not trip out a sound line.

As shown in Fig. 1, each circuit breaker 7 and 8 has an auxiliary contact 87 in series with its tripping coil for deenergizing the corresponding tripping coil 9 or 10 and the associated pilot-wire relay 71 or 72, as soon as the circuit breaker has been opened or partially opened.

As the current coils 40 of the respective impedance elements are connected in delta, in the system shown in Fig. 1, it is necessary to provide a return path for the residual or zero-sequence currents, which is done by means of two Y-connected transformer banks 88 and 89, the neutral points of which are connected to the neutral circuits of the current transformers 26 and 27, so that the residual currents of each current transformer may return to the neutral Y connection of said current transformer through the associated residual-current apparatus 12, 50, 84 and 12, 51, 85, respectively. The Y-connected transformer banks 88 and 89 are provided with secondary windings 90 which are so connected as to permit the non-inductive flow of equal, in-phase, or zero-sequence, currents in the three primary phases, while permitting only small magnetizing currents to flow in the case of the positive and negative phase-sequence components. As shown in Fig. 1, the secondary windings 90 may be connected in a single closed delta circuit for each of said transformer banks.

In Fig. 2, my invention is shown in what is perhaps the preferred form of embodiment, utilizing high-frequency impulses superimposed on one of the phase conductors of one of the parallel lines 4 and 5. In Fig. 2, the far end of the lines 4 and 5 is also indicated, the same comprising a bus 91, a circuit breaker 92 in each line, and a duplication of the tripping and relaying apparatus of the first line terminal.

In Fig. 2, the relaying apparatus at each terminal is disposed in three groups, designated "tripping relays" 93, "interlock relays" 94 and "high-frequency apparatus" 95, as indicated by dotted line rectangles. The tripping and interlocking relays may be the same as shown in Fig. 1 or they may be of any other preferred type, and they are indicated much more sketchily than in Fig. 1. In Fig. 2, for example, the current coils of the impedance and directional elements 96 and 97 are connected in star, only one phase of each transmission line being indicated, with the understanding that the apparatus is duplicated for the other phases. The voltage coil 98 of each impedance relay 96 is connected to the delta voltage which leads the corresponding line current by 30 degrees when the line is operating at unity power factor. The voltage-coil terminals 99 of each directional element are energized from the delta line voltage which lags 30 degrees behind said current when the line is operating at unity power factor.

The high-frequency apparatus at each terminal of the three-phase transmission system shown in Fig. 2 is single-phase apparatus connected to any phase of the line 5, such as the C phase, by means of a novel coupling means which constitutes an important item in the design of a practically usable superimposed high-frequency system. In this high-frequency relaying system a different frequency is used for each of the lines 4 and 5, in order to obtain selective tripping of the two lines, 720 cycles being utilized for tripping line 4 and 480 cycles being utilized for tripping the other line 5. In order to provide an overabundance of tripping energy, 5 kilowatts are provided in each of the two high frequencies, so that the coupling means must be designed to satisfactorily handle this power.

The coupling means at each end of the line comprises two air-core choke coils or reactors 101 and 102 connected in series with the C phase conductor of the line 5. No connection is necessary to line 4 because the lines are bussed together at their two ends. To give a concrete illustration, in a system in which the normal full-load 60-cycle current is 1000 amperes, at 220 kilovolts, each of the reactors 101 and 102 is rated at 1000 amperes and has a 60-cycle impedance of about one-half ohm, so that the total 60-cycle voltage-drop across the two reactors is about 1000 volts, which may be increased to 10,000 volts upon the occurrence of a fault.

The high-frequency apparatus is insulated from the 220-kilovolt transmission line by means of an insulating transformer 103 having any suitable ratio, such as 5/1 or 7/1. The high-voltage side of the insulating transformer 103 is connected across the two reactors 101 and 102, whereas the low-voltage side is connected to the high-frequency sending and receiving apparatus. The insulating transformer must be of the iron-core type in order to have reasonable efficiency, but it must be designed so that it will not become saturated by the maximum 60-cycle voltage, in this case 10,000 volts, which may be impressed across it at times of system faults, so that the coupling transformer will still be useful for transmitting the high-frequency impulses at these times. The coupling transformer is designed to carry 5 amperes of high-frequency energy at 1000 volts on the high-frequency side of the transformer.

The high-frequency energy is preferably excluded from the reactors 101 and 102 by means of two banks of outdoor capacitors 104 and 105, rated respectively at 55 and 120 kva. at 60 cycles, which are connected in parallel to the two reactors 101 and 102, respectively, so as to provide anti-resonant circuits for the 720-cycle currents and the 480-cycle currents, respectively.

The secondary winding of the coupling transformer 103 is connected exclusively to circuits which are tuned for the high-frequency currents, so that substantially no 60-cycle current flows except the magnetizing current which is quite small. Two principal tuned circuits are connected across the coupling or insulating transformer 103 on the low voltage side, the same comprising a small air-core reactor 107 in series with a capacitor 108 tuned to 480 cycles, and a small air-core reactor 109 in series with a capacitor 110 tuned to 720 cycles.

The high-frequency energy is coupled to the respective coils 107 and 109 just mentioned, whenever the tripping circuits 67 or 65, respectively, are energized, this function being accomplished by relays 112 and 113 which are connected across the respective tripping circuits, said relays having normally open contacts 114 and 115, respectively, for connecting the high-frequency sources to the respective reactors 107 and 109, which may be tapped for the purpose.

The high-frequency source comprises two single-phase 5-kilowatt generators 118 and 119 of 480 cycles and 720 cycles, respectively. These are dynamo-electric machines which are constantly running, being driven at a high speed, through suitable gearing 120, from a motor 121, and being excited from an exciter bus 122.

High-frequency current of either 480 cycles or 720 cycles is thus fed into the transmission system 4, 5, 6, 91, according as the tripping coil 10 of line 5 or the tripping coil 9 of line 4 is energized, this being accomplished by the quick-acting relays 112 and 113, the actuating coils of which are connected in parallel with the respective tripping coils 10 and 9.

The high-frequency currents which are sent out over the C phase conductor of the transmission system are of only a few cycles duration, with respect to the 60-cycle energy, because they are interrupted, as soon as the circuit-breaker tripping energy is interrupted by means of the auxiliary contacts 87 on each of the circuit breakers. This is a very decided advantage over previous high-frequency systems in which high-frequency currents were sent over the transmission system either continuously or for relatively long time periods, because such high-frequency currents are likely to set up inductive disturbances which would render nearby telephone circuits unusable. When this inductive disturbance lasts for only a fifth of a second, or less, as in my system wherein high-speed relays and circuit breakers are utilized, no substantial interruption of the nearby telephone service will be encountered, as only a very brief momentary sound can possibly be heard.

The high-frequency impulses which are received through the coupling transformer 103 are applied to high-frequency relays 130 and 131 which are tapped off from the small tuned-circuit reactors 107 and 109, respectively. The 60-cycle current is excluded from the actuating coil of each of the high-frequency relays 130 and 131 by means of a small capacitor 132 which may be tuned to the frequency which its relay is supposed to carry. The two high-frequency relays 130 and 131 are protected from damage by the powerful currents of the high-frequency generators 118 and 119, respectively, by means of back contacts 134 and 135 on the relays 112 and 113 which connect the generators and at the same time disconnect the high-frequency relays 130 and 131, respectively.

The contacts of the high-frequency relays 130 and 131 are in series with the interlocking relaying devices 84, 86 and 85, 86 as described in connection with Fig. 1.

It is customary, in some fault-responsive relaying systems, to provide contactor switches for short-circuiting the relay contacts as soon as a tripping circuit is energized, so as to relieve the relay contacts and permit them to be made as light as possible. These contactor switches are particularly necessary in the system shown in Fig. 2, in order to prevent the tripping circuit from being interrupted when the relay 112 or 113 is energized. Such contactor switches are shown at 137 and 138.

Another feature of my invention is shown in Fig. 2 in the shape of resistors 139 and 140 which are connected in shunt across the respective tripping coils 9 and 10 for the purpose of providing a noninductive by-pass circuit in which the current will be built up almost instantaneously, as distinguished from the slow building up of the current in the highly inductive tripping coils. Oscillographic tests have shown that several cycles are sometimes lost on account of the fluttering or chattering of the tripping relay contacts under such circumstances that the current does not build up to a sufficiently high value either to actuate the contactor switch 137 or 138 or to sustain a tiny arc across the fluttering contacts. According to my invention, the resistors 139 and 140, or equivalent means, are provided for instantaneously drawing a current of the order of one ampere through the tripping relay contacts, so that if these contacts should momentarily open a very short distance a tiny arc would be established thereacross so as to prevent the opening of the tripping circuit.

In the form of embodiment of my invention shown in Fig. 3, high-frequency impulses are sent through a pilot wire 142 instead of through the transmission system, and in this case the pilot wire may be a part of a telephone cable in which direct-current impulses, such as were utilized in the polarized relay system of Fig. 1, would travel too slowly to give satisfactory relay operation. The telephone cable is indicated at 143 and is illustrated as being broken at some midpoint by a repeater station 144.

In the high-frequency system shown in Fig. 3, the previously described switches 112 and 113 are utilized for connecting the respective high-frequency sources and disconnecting the respective high-frequency relaying equipment from the pilot wire 142 through suitable filters 146. The received high-frequency impulses, after being passed through the back contacts 134 and 135 of the switches 112 and 113, respectively, are in this case passed through an amplifier 148 and a rectifier 150 and then applied to a direct-current relay 152 or 153, as the case may be, to take the place of the high-frequency relays 130 and 131 of Fig. 2, for energizing the respective trip circuits of the circuit breakers through the interlocking relays 94.

It will be noted that my pilot-wire or high-frequency relay-system does not rely upon the pilot wire or high frequency as the sole relaying means, but merely as an auxiliary to a relay system which is otherwise complete, and which, without the pilot wire or high frequency, would produce simultaneous tripping for all faults except those located close to the terminals of a line-section and sequential tripping for said terminal faults. My pilot-wire or high-frequency system merely adds simultaneous operation for said terminal faults, and if it should fail for any reason, sequential relaying would still be obtained, so that the line would not be altogether without protection.

While I have shown my invention in several embodiments which I now believe to be the best modes in which to apply the principles of my invention, it will be obvious that many features may be added and some may be omitted or changed in degree without departing from the essential spirit of my invention. I desire, therefore, that the appended claims be given the broadest construction consistent with their language and the prior art.

I claim as my invention:

1. The combination with an electric power line having two circuit breakers therein at spaced stations, each circuit breaker having a tripping circuit, of relaying equipment at each station, comprising fault-distance-responsive tripping-relay elements for energizing the tripping circuit of the adjacent circuit breaker in response to faults up to predetermined distances, said predetermined distances being less than the distance between the two spaced stations, means at each station for sending a tripping-controlling current to the other station in accordance with the condition of energization of the tripping circuit at the sending station, and means at each station for receiving said tripping-controlling current and applying it to the control of the tripping of its circuit breaker.

2. The combination with a multi-circuit power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory tripping-controlling current to the other station in accordance with the condition of energization of the tripping circuit at the sending station, and line-discriminatory means at each station for receiving said tripping-controlling current and applying it to the control of the tripping of its proper circuit breaker for clearing the other end of the faulted line.

3. The combination with a multi-circuit power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory tripping-controlling current to the other station in accordance with the condition of energization of the tripping circuit at the sending station, and line-discriminatory means at each station for receiving said tripping-controlling current and applying it to the control of the tripping of its proper circuit breaker for clearing the other end of the faulted line, said line-discriminatory receiving means comprising means for segregating, and selectively responding to the different line-discriminatory tripping-controlling currents, and also comprising fault-detector interlock-contact relay elements which are not of themselves able fully to discriminate the faulted line under all conditions but which are able to detect and indicate the presence of a fault somewhere.

4. The combination with an alternating-current power line having two circuit breakers therein at spaced stations, each circuit breaker having a tripping circuit, of relaying equipment at each station, comprising fault-distance-responsive tripping-relay elements for energizing the tripping circuit of the adjacent circuit breaker in response to faults up to predetermined distances, said predetermined distances being less than the distance between the two spaced stations, tuned high-frequency means at each station for sending a high-frequency tripping-controlling current to the other station in accordance with the condition of energization of the tripping circuit at the sending station, and tuned high-frequency means at each station for receiving said tripping-controlling current and applying it to the control of the tripping of its circuit breaker, characterized by means for coupling said high-frequency sending and receiving means to a line-conductor at each of said stations, each coupling means comprising an inductive reactor shunted by a tuned capacitor directly connected as an anti-resonant circuit tuned to said high-frequency in series with said line-conductor, and an insulating transformer having one winding connected across said inductive reactor and another winding connected to said high-frequency sending and/or receiving means.

5. The combination with a multi-circuit polyphase power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory high-frequency tripping current to the other station whenever a tripping circuit is energized, said sending means sending a current of a different frequency for each of the parallel power lines, and line-discriminatory means at each station for receiving said tripping current and applying it to the tripping of its proper circuit breaker for clearing the other end of the faulted line.

6. The combination with a multi-circuit power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory alternating tripping current to the other station whenever a tripping circuit is energized, said sending means sending a current of a different frequency for each of the parallel power lines, and line-discriminatory means at each station for receiving said tripping current and applying it to the tripping of its proper circuit breaker for clearing the other end of the faulted line.

7. The combination with a multi-circuit polyphase power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory high-frequency tripping current to the other station whenever a tripping circuit is energized, said sending means sending a current of a different frequency for each of the parallel power lines, and line-discriminatory means at each station for receiving said tripping current and applying it to the tripping of its proper circuit breaker for clearing the other end of the faulted line, said line-discriminatory receiving means comprising means for segregating, and selectively responding to, the different line-discriminatory tripping currents, and also comprising fault-detector interlock-contact relay elements which are not of themselves able fully to discriminate the faulted line under all conditions but which are able to detect and indicate the presence of a fault somewhere.

8. The combination with a multi-circuit power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory alternating tripping current to the other station whenever a tripping circuit is energized, said sending means sending a current of a different frequency for each of the parallel power lines, and line-discriminatory means at each station for receiving said tripping current and applying it to the tripping of its proper circuit breaker for clearing the other end of the faulted line, said line-discriminatory receiving means comprising means for segregating, and selectively responding to, the different line-discriminatory tripping currents, and also comprising fault-detector interlock-contact relay elements which are not of themselves able fully to discriminate the faulted line under all conditions but which are able to detect and indicate the presence of a fault somewhere.

9. The combination with an electric power line having two circuit breakers therein at spaced stations, of relaying equipment at each station, each circuit breaker having a tripping circuit, and each relaying equipment comprising fault-distance-responsive tripping-relay elements for energizing the tripping circuit of the adjacent circuit breaker in response to faults up to predetermined distances, said predetermined distances being less than the distance between the two spaced stations, means at each station for sending a tripping-controlling current to the other station in accordance with the condition of energization of the tripping circuit at the sending station, and means at each station for receiving said tripping-controlling current and applying it to the control of the tripping of its circuit breaker, said receiving means comprising fault-detector interlock-contact relay elements which are not of themselves able fully to discriminate the faulted line under all conditions but which are able to detect and indicate the presence of a fault somewhere.

10. The combination with an electric power line having two circuit breakers therein at spaced stations, each circuit breaker having a tripping circuit, of relaying equipment at each station, comprising fault-distance-responsive tripping-relay elements for energizing the tripping circuit of the adjacent circuit breaker in response to faults up to predetermined distances, said predetermined distances being less than the distance between the two spaced stations, means at each station for sending a tripping-controlling current to the other station in accordance with the condition of energization of the tripping circuit at the sending station, and means at each station for receiving said tripping-controlling current and applying it to the control of the tripping of its circuit breaker, said receiving means comprising fault-detector interlock-contact relay elements which are not of themselves able fully to discriminate the faulted line under all conditions but which are able to detect and indicate the presence of a fault somewhere; characterized by the fact that said fault-distance-responsive tripping-relay elements comprise an instantaneous impedance-responsive element which never picks up for faults located as far away as the other circuit breaker, a second instantaneous impedance-responsive element which will pick up for faults located as far away as the other circuit breaker, and a time-delay relay-element set in operation by said second instantaneous impedance-responsive element; and further characterized by the fact that said fault-detector interlock-contact relay elements comprise contacts on said second instantaneous impedance-responsive element.

11. The combination with an alternating-current power line having two circuit breakers therein at spaced stations, each circuit breaker having a tripping circuit, of relaying equipment at each station, comprising fault-distance-responsive tripping-relay elements for energizing the tripping circuit of the adjacent circuit breaker in response to faults up to predetermined distances, said predetermined distances being less than the distance between the two spaced stations, tuned high-frequency means at each station for sending a high-frequency tripping-controlling current to the other station in accordance with the condition of energization of the tripping circuit at the sending station, and tuned high-frequency means at each station for receiving said tripping-controlling current and applying it to the control of the tripping of its circuit breaker, said receiving means comprising fault-detector interlock-contact relay elements which are not of themselves able fully to discriminate the faulted line under all conditions but which are able to detect and indicate the presence of a fault somewhere.

12. The combination with an electric power line having two circuit breakers therein at spaced stations, each circuit breaker having a tripping circuit, of relaying equipment at each station, comprising fault-distance-responsive tripping relay elements for energizing the tripping circuit of the adjacent circuit breaker in response to faults up to predetermined distances, said predetermined distances being less than the distance between the two spaced stations, means at each station for sending a high-frequency tripping current to the other station whenever a tripping circuit is energized, means at each station for receiving said tripping current and applying it to the tripping of its circuit breaker and means responsive to the opening of a circuit breaker for interrupting the high-frequency tripping current.

13. The combination with a multi-circuit polyphase power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory high-frequency tripping current to the other station whenever a tripping circuit is energized, said sending means sending a current of a different frequency for each of the parallel power lines, line-discriminatory means at each station for receiving said tripping current and applying it to the tripping of its proper circuit breaker for clearing the other end of the faulted line, and means responsive to the opening of a circuit breaker for interrupting the high-frequency tripping current.

14. The combination with a multi-circuit polyphase power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory high-frequency tripping current to the other station whenever a tripping circuit is energized, said sending means sending a current of a different frequency for each of the parallel power lines, line-discriminatory means at each station for receiving said tripping current and applying it to the tripping of its proper circuit breaker for clearing the other end of the faulted line, said line-discriminatory receiving means comprising means for segregating, and selectively responding to, the different line-discriminatory tripping currents, and also comprising fault-detector interlock-contact relay elements which are not of themselves able fully to discriminate the faulted line under all conditions but which are able to detect and indicate the presence of a fault somewhere, and means for automatically interrupting the high-frequency tripping circuit after a brief time sufficient for the tripping of the circuit breaker.

15. An electric power line comprising a circuit breaker, a tripping coil therefor, a source of tripping current for said tripping coil, a line-fault responsive relay having contacts for closing a tripping circuit through said tripping coil from said source, a contactor switch for closing a holding circuit across the relay contacts when the tripping circuit is energized, and a substantially non-inductive resistance shunted across said tripping coil, said resistor having a resistance such as to carry a current of the order of an ampere for producing an arc across said relay contacts in the event of fluttering of the latter.

16. An electric power line comprising a circuit breaker, a tripping coil therefor, a source of tripping current for said tripping coil, a line-fault responsive relay having contacts for closing a tripping circuit through said tripping coil from said source, a contactor switch having an actuating coil energized by said tripping circuit and having contacts for closing a holding circuit across the relay contacts when the tripping circuit is energized, a substantially non-inductive impedance device shunted across said tripping coil, said device having an impedance such as to carry a current of the order of an ampere for producing an arc across said relay contacts in the event of fluttering of the latter, and means responsive to the opening of the circuit breaker for interrupting the current in the tripping coil.

17. An electric power line comprising a circuit breaker, a tripping coil therefor, a source of tripping current for said tripping coil, a line-fault responsive relay having contacts for closing a tripping circuit through said tripping coil from said source, and a by-pass circuit in which current builds up faster than in said tripping coil for instantly drawing a sufficient current through said relay contacts to maintain a short arc and thus prevent interruption of the tripping circuit upon chattering of the relay contacts.

18. The combination with an electric power line having two circuit breakers therein at spaced stations, each circuit breaker having a tripping circuit, of relaying equipment at each station, comprising fault-distance-responsive tripping-relay elements for energizing the tripping circuit of the adjacent circuit breaker in response to faults up to predetermined distances, said predetermined distances being less than the distance between the two spaced stations, means at each station for sending a tripping current to the other station whenever a tripping circuit is energized, and means at each station for receiving said tripping current and applying it to the tripping of its circuit breaker, characterized by having auxiliary relay means for normally disconnecting the tripping-current sending means and connecting the tripping-current receiving means, said auxiliary relay means being automatically operable to disconnect the receiving means upon the energization of the tripping circuit of the circuit breaker which is associated with said receiving means, and a contactor switch for closing a holding circuit across the tripping circuit before said auxiliary relay means is actuated.

19. The combination with a multi-circuit alternating-current power system comprising a plurality of lines in parallel between two spaced stations, of circuit breakers and relaying equipment at each station, each circuit breaker having a tripping circuit, and each relaying equipment comprising fault-distance-responsive line-discriminatory tripping-relay elements for energizing the tripping circuit of the proper adjacent circuit breaker for clearing a faulted line in response to faults up to predetermined distances, said predetermined distances being less than the distance between the two spaced stations, means at each station for sending a line-discriminatory high-frequency tripping current to the other station whenever a tripping circuit is energized, said sending means sending a current of a different frequency for each of the parallel power lines, and line-discriminatory means at each station for receiving said tripping current and applying it to the tripping of its proper circuit breaker for clearing the other end of the faulted line, characterized by means for coupling said high-frequency sending and receiving means to a line-conductor at each of said stations, each coupling means comprising as many inductor elements as there are high-frequency tripping currents, each inductor element being shunted by a tuned capacitor to provide a plurality of anti-resonant circuits tuned to the respective high-frequency currents, said anti-resonant circuits being in series with each other and directly connected in series with said line-conductor, and an insulating transformer having one winding connected across said serially connected anti-resonant circuits and another winding connected to said high-frequency sending and/or receiving means, the latter comprising means for substantially excluding currents of the power-line frequency and for segregating, and selectively responding to, the different line-discriminatory tripping currents.

20. An electric power line comprising a circuit breaker, a tripping coil therefor, a source of tripping current for said tripping coil, a line-fault responsive relay having contacts for closing a tripping circuit through said tripping coil from said source, and a contactor switch for closing a holding circuit across the relay contacts when the tripping circuit is energized, characterized by means for insuring such speed of action of the contactor switch that it will respond to substantially the first momentary closure of the tripping relay contacts in spite of chattering of the latter.

21. The combination with an electric power line, of means for isolating both ends of a faulty line section, comprising fault-distance responsive relaying means at both ends of such character as to produce, by their own operation, simultaneous substantially instantaneous relaying response for centrally located faults and sequential response for faults located close to either end of the line section, characterized by substantially instantaneously operating means for sending a tripping impulse from one end to the other so as to produce substantially simultaneous isolation of both ends of the line section for faults located anywhere therein.

22. The combination with an electric power-transmitting system having a plurality of individual line-sections each having a circuit breaker at each end thereof, of an auxiliary source of relaying energy of a frequency different from said power line, selective line-discriminatory tuned-circuit relaying means responsive to said relaying frequency for insuring the substantially simultaneous tripping of both circuit breakers of a faulty line-section, and interlock-contact relay-means carrying currents derived from the power line rather than the relaying-frequency source for detecting the presence of a fault somewhere on the power system without always discriminating as to which line-section is faulted, said interlock-contact relay-means comprising contacts for locking out said tuned relaying means except when there is a fault somewhere on the system.

23. A multi-circuit polyphase transmission line comprising sectionalizing circuit breakers in the several circuits, and a relaying system for selectively tripping the relays of a faulty circuit, comprising current-transformer coupling means in series with the same phase of the transmission system at each of two sectionalizing points, an auxiliary source of a different tripping-frequency current distinctive to each of said parallel circuits for discriminating therebetween, and tuned-circuit relaying means for receiving said auxiliary currents, said auxiliary sources and tuned-circuit relaying means being connected to said current-transformer coupling means.

24. The combination with a sectionalized alternating-current transmission system having a line-section with a circuit-interrupter means at each end, of a relaying station associated with each of said circuit-interrupter means for isolating said line-section in the event of a fault therein, each of said relaying stations comprising a source of relaying current of frequency different from the line-frequency at which power is transmitted over said transmission system, quick-acting fault-detecting means responsive to some function of the line-frequency current and the line-frequency voltage of the transmission system for selectively operating its circuit-interrupter means at the same station in response to faults lying within the line-section being protected and at least within its nearest half of said line-section and for at the same time superimposing upon the line-section a relaying current from its relaying-current source, and auxiliary relaying means selectively responsive to relaying currents superimposed on the line at the other end of the line-section for effecting an operating control on the circuit-interrupter means at its own end of the line-section.

25. The combination with a sectionalized alternating-current transmission system having a line-section with a circuit interrupter means at each end, of a relaying station associated with each of said circuit-interrupter means for isolating said line-section in the event of a fault therein, each of said relaying stations comprising quick-acting fault-detecting means responsive to some function of the line-frequency current and the line-frequency voltage of the transmission system for selectively operating its circuit interrupter means at the same station in response to faults lying within the line-section being protected and at least within its nearest half of said line-section and for at the same time causing a high-frequency relaying-current impulse to be communicated to the relaying station at the other end of said line-section, and auxiliary relaying means selectively responsive to high-frequency relaying-current impulses received from said other station for effecting an operating control on the circuit-interrupter means at its own end of the line-section.

26. The combination with an alternating-current power line, of means for isolating both ends of a faulty line section, comprising fault-distance responsive relaying means at both ends responsive to some function of the line-frequency current and the line-frequency voltage of the power line so as to produce, by their own operation, simultaneous substantially instantaneous relaying response for centrally located faults and sequential response for faults located close to either end of the line section, characterized by substantially instantaneously operating means for sending a tripping impulse from one end to the other so as to produce substantially simultaneous isolation of both ends of the line section for faults located anywhere therein.

27. A multi-circuit alternating-current line comprising a plurality of line-sections normally having their corresponding line-conductors bussed together at their respective ends, and high-frequency relaying means for said line, characterized by means for supplying high-frequency currents, and coupling means for introducing and taking off the high-frequency currents in series circuit relation in and from a circuit which includes one of said line-conductors extending in one direction throughout the length of one line-section, through the bus at that end, back throughout the length of a parallel line-section, and through the other bus to the starting point.

ROYAL C. BERGVALL.